United States Patent [19]
Minkkinen et al.

[11] Patent Number: 5,520,249
[45] Date of Patent: May 28, 1996

[54] PROCESS FOR THE PRETREATMENT OF A NATURAL GAS CONTAINING HYDROGEN SULPHIDE

[75] Inventors: Ari Minkkinen, Saint Nom la Breteche; Daniel Benayoun, Sartrouville; Yves Barthel, Le Pecq, all of France

[73] Assignee: Institut Francais du Petrole, Rueil Malmaison, France

[21] Appl. No.: 382,405

[22] Filed: Feb. 1, 1995

[51] Int. Cl.$^6$ .......................... E21B 43/40; B01D 53/14
[52] U.S. Cl. .......................... 166/266; 55/223; 55/257.1; 166/267; 405/128
[58] Field of Search .......................... 166/266, 267, 166/268; 405/128; 588/250; 55/223, 257.1, 338

[56] References Cited

U.S. PATENT DOCUMENTS

| | | | |
|---|---|---|---|
| 2,582,148 | 1/1952 | Nelly, Jr. | 166/266 |
| 3,274,101 | 9/1966 | West et al. | 166/266 X |
| 3,488,092 | 1/1970 | Dean et al. | 166/267 X |
| 3,989,478 | 11/1976 | Jones | 166/267 X |
| 4,072,604 | 2/1978 | Ward | 55/223 X |
| 4,521,221 | 6/1985 | Richter et al. | 166/267 X |
| 4,979,966 | 12/1990 | Rojey et al. | 55/223 X |
| 5,335,728 | 8/1994 | Strahan | 166/267 |
| 5,351,756 | 10/1994 | Minkkinen et al. | 166/267 |

FOREIGN PATENT DOCUMENTS 0362023  4/1990  European Pat. Off. .

*Primary Examiner*—George A. Suchfield
*Attorney, Agent, or Firm*—Millen, White, Zelano, & Branigan

[57] ABSTRACT

A process is described for the pretreatment of a pressurized natural gas which is saturated with water and contains hydrocarbons and hydrogen sulfide ($H_2S$) from a producing well. At least a portion of the natural gas (1) is brought into contact with at least a portion of recycled liquid condensate (2) in a cyclone (5). The vapor phase (6), containing $H_2S$ and hydrocarbons, is cooled in zone (20), condensed and separated in separator (3). A gas (30) which is enriched in methane and depleted in $H_2S$ is recovered while the condensate (8) is recycled to cyclone (5) after preheating if necessary. A water-containing liquid effluent (7) which is enriched in $H_2S$ and depleted in hydrocarbons is recovered from the bottom of cyclone (5). This is reintroduced into the well (10).

24 Claims, 1 Drawing Sheet

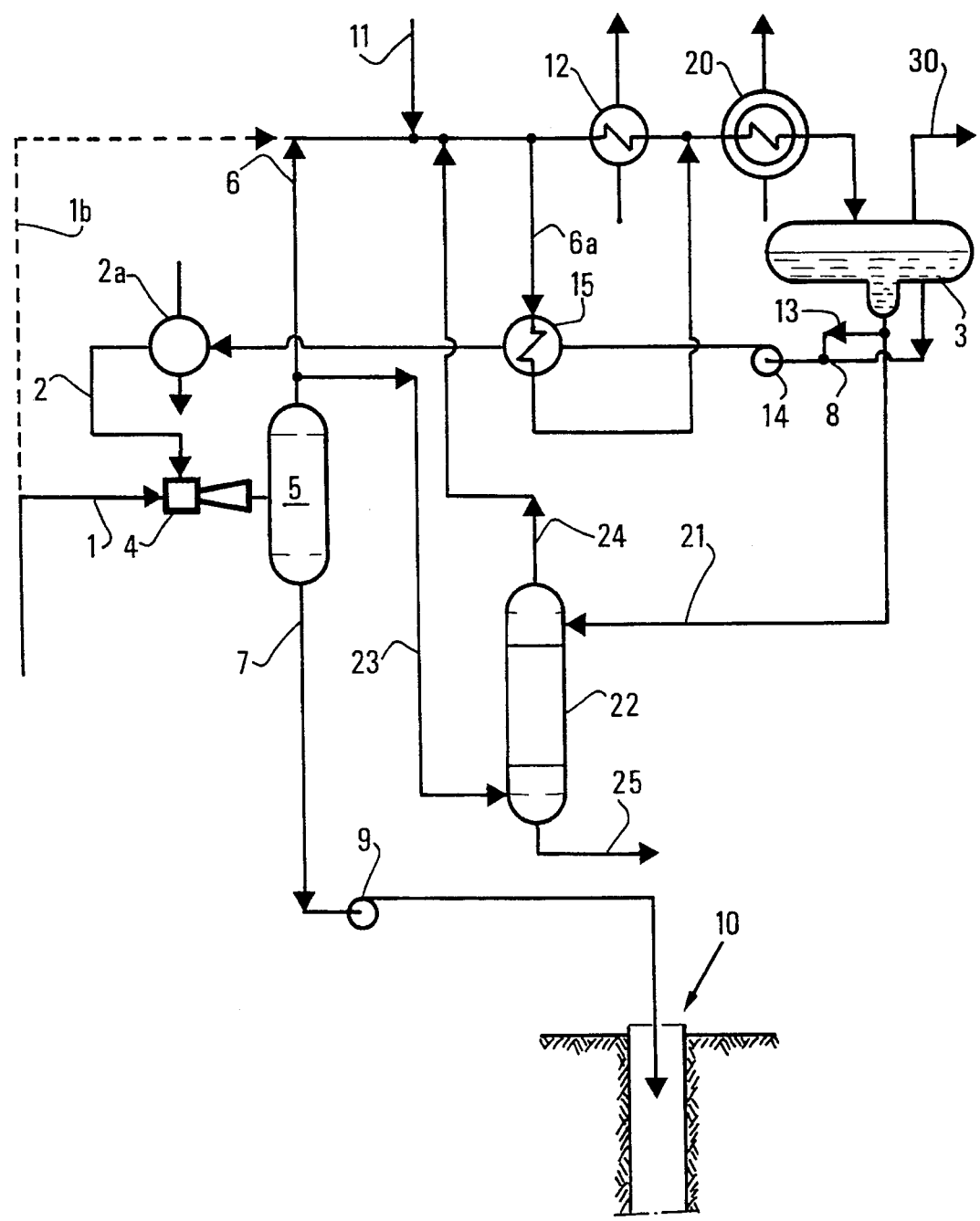

PROCESS FOR THE PRETREATMENT OF A NATURAL GAS CONTAINING HYDROGEN SULPHIDE

SUMMARY OF THE INVENTION

The invention concerns a process for the pretreatment of a very acidic natural gas containing a substantial quantity of hydrogen sulphide ($H_2S$) which may be combined with carbon dioxide ($CO_2$).

European patent EP-B-0 362 023 describes this type of natural gas.

A gas producer is faced with a dilemma when confronted with the need to treat a very acidic natural gas containing, for example, more than 20 mole % of hydrogen sulphide, especially as it is known that the gas production rate is over 2 million cubic meters per day and that production of sulphur cannot be justified economically. It is a question of how to eliminate a large quantity of hydrogen sulphide while complying with safety and environmental standards, and how to reduce the energy consumption involved in separating and eliminating hydrogen sulphide.

Occasionally, hydrogen sulphide and carbon dioxide from a natural gas can be eliminated by reinjecting the recovered mixture into a reservoir which is partially exhausted, thus avoiding the need for a downstream sulphur recovery unit to be installed which is expensive and consumes a large amount of energy.

In order to be able to sell a gas containing less than 3 ppm by volume of hydrogen sulphide, separation techniques must be employed which must be selective towards this poison, since carbon dioxide and hydrogen sulphide have differing purity requirements. A concentration of 2% to 4% by volume of $CO_2$ is tolerated in a gas intended for sale. This objective can be attained using a two step process: a step in which the acid content is partially reduced by a membrane separation process, followed by a step in which the partially purified gas is washed with a selective solvent or amine. Selective membranes are known to allow $H_2S$ and $CO_2$ to diffuse more easily than the hydrocarbons (in particular methane) contained in natural gas. There are serious problems with this apparently simple process, however, in particular when the $H_2S$ rich acid gas is to be reinjected at high pressure into the reservoir.

The main problem with pretreatment by membrane permeation resides in the fact that the $H_2S$ and $CO_2$ rich permeate has to be recovered, downstream of the membrane, at a very low pressure in order for the process to be efficient. It follows that, if the gas is neither burned off nor sent to a sulphur recovery unit, it becomes necessary to recompress the gas to the pressure of the reservoir, involving high compression costs and high energy consumption.

A second problem with the membrane permeation process derives from the fact that the membrane is not perfectly selective towards acidic gases and allows considerable diffusion of methane into the permeate. The loss of marketable methane can be as high as 10% to 15% of the feed introduced.

One of the objects of the invention is thus to overcome the problems mentioned above.

A further object is to pretreat a natural gas which is very rich in $H_2S$ and $CO_2$ to render it exploitable and marketable without damaging the environment.

A further object of the invention is to dehydrate the gas and eliminate the majority of the acidic constituents in liquid form, into a partially exhausted reservoir.

In general, the invention concerns a process for the pretreatment of a pressurized natural gas which is saturated with water and contains mainly hydrocarbons and a substantial quantity of hydrogen sulphide, from at least one producing well, characterized in that:

a) at least a portion of the natural gas is brought into contact with at least a portion of a recycled liquid condensate from step d) below in a contact and vaporizing zone under appropriate contact conditions, and a vapor phase containing hydrogen sulphide and hydrocarbons is recovered overhead and a liquid effluent containing a major portion of the hydrogen sulphide, water and a minor portion of hydrocarbons is recovered from the bottom;

b) at least a portion of the vapor phase is cooled and condensed in a cooling or depressurizing step under suitable cooling or depressurizing conditions;

c) the condensate obtained is separated in a separation zone and a gas which is enriched in hydrocarbons and depleted in hydrogen sulphide is recovered along with a liquid condensate which is enriched in hydrogen sulphide and contains hydrocarbons;

d) the liquid condensate is recycled to the contact zone, and e) the liquid effluent is reintroduced into the producing well or into a different well.

The term hydrocarbons means mainly methane and small percentages of ethane, propane and butane. The acidic natural gas may have a partial pressure of hydrogen sulphide of at least 5 bar, preferably at least 10 bar (1 bar=$10^5$ Pa). It may also contain carbon dioxide.

In order to achieve an effective flash in the contact zone (stripper) between the liquid condensate and the very acidic natural gas leaving the well, the condensate can be at least partially preheated by a heat exchanger to vaporize at least a portion of the hydrocarbons which are contained therein in too high a concentration.

In a further embodiment of the process, the liquid condensate can be preheated by at least a portion of the vapor phase leaving the contact zone, in a suitable heat exchange zone. It may be advantageous to combine these two preheating modes to vaporize the hydrocarbons which are to be recovered more effectively and increase the solubility of the water in the liquid stream containing $H_2S$.

Vaporizing the methane and the light hydrocarbons dissolved in the mixture can directly cool the gas feed from the well, for example by 5° C. to 10° C., which causes the hydrates formed in the presence of free water and $H_2S$ to precipitate. These are recovered in the liquid phase which is reinjected into the partially exhausted reservoir. To this end, the contact vessel for bringing the gas and liquid streams into contact, preferably a cyclone, can be adapted to recover these hydrates in its lower portion.

Water has a rather high solubility in the $H_2S$ (for example, more than 1 mole % under the experimental conditions: 25° C., 85 bar absolute) so that substantially all the water in the acidic gas entering the vessel can be displaced by dissolution in the $H_2S$ rich liquid phase constituting the liquid effluent which is reintroduced into the reservoir. This is in fact a water extraction step which minimizes or completely eliminates the condensation of water and the formation of free water in the cooling and condensing step.

However, if the vapor phase leaving the vessel overhead also contains a substantial quantity of water, a suitable quantity of methanol can be introduced into the vapor phase upstream of the cooling zone to prevent hydrate formation in the cooling step.

If, however, the vapor phase taken overhead from this vessel still contains a substantial quantity of water, a suitable quantity of methanol can be introduced into the vapor phase upstream of the cooling zone to prevent hydrate formation in the cooling zone.

In a first embodiment, the water and alcohol, which have been separated after condensing from the liquid condensate in a drum separator, can be recycled with the condensate to the contact zone. A portion of the methanol can be vaporized with the gaseous phase, a further portion in the liquid phase being reinjected into the well.

In a further embodiment, the water and methanol which have been separated after condensing from the condensate, can be sent to a multi-stage counter-current stripping zone which uses at least a portion of the vapor phase. Thus an effluent vapor which is enriched in methanol is recovered overhead form the stripping zone and recycled upstream of the cooling zone. Water is recovered from the bottom and can be reintroduced into the reservoir. This stripping zone can advantageously be integrated into the zone in which the liquid condensate is brought into contact with the natural gas.

Advantageously, the $H_2S$ rich condensate liquid is mixed with the natural gas upstream of the contact vessel using a static mixer, an ejector, a sprayer or simply a sufficient length of conduit.

The operating conditions of the process are generally as follows:

a) Contact vessel:
T°=0° to 100° C., preferably 20° C. to 60° C.
P>10 bar absolute, preferably 40 to 100 bar b) Zone for separation and cooling:
T° C.=−80° C. to +30° C., preferably −40° C. to 0° C.
P>10 bar absolute, preferably 40 to 100 bar c) Preheating temperature:
T°=−10° C. to +90° C., preferably +10° C. to +50° C.

It may be advantageous to compress the natural gas as it leaves the producing well, in particular when the reservoir is partially exhausted.

The advantage of the present invention is thus that the gas is concentrated in methane and simultaneously dehydrated. In addition, an $H_2S$ enriched effluent can be reintroduced into the well by injection in liquid form and thus at reduced cost than if pumping had been required.

BRIEF DESCRIPTION OF THE DRAWING

The invention will be better understood from the FIGURE wherein an embodiment of the inventive process is shown. However, the FIGURE is intended to illustrative the inventive process, not limit it.

DETAILED DESCRIPTION

The following example of the inventive process is intended to illustrate the process but not to limit it.

A very acidic natural gas from a producing well, at a pressure of 83 bar and a temperature of 50° C., saturated with water (1940 ppm in moles) and containing 34 mole % of $H_2S$, 11 mole % of $CO_2$ and 55 mole % of methane (less than 1% by weight of $C_{2+}$) was tangentially introduced via line 1 into a cyclone type contact vessel 5. The whole of the gas could not be sent to cyclone 5: a portion of the gas could be introduced into a pretreatment zone via line 1b (broken line) downstream of cyclone 5. Upstream of cyclone 5, line 2 and sprayer 4 recycled a $H_2S$ and $CO_2$ rich liquid condensate which also contained a substantial quantity of methane from a separation vessel 3 into line 1. This condensate was preheated to about 30° C. by external exchanger 2a and by heat exchanger 15 which indirectly removed heat from a portion of the vapor phase (line 6a) from vessel 5.

Contact took place substantially at the input pressure of the acidic gas (for example, 82 bar) and at a temperature of 38° C. Flashing and stripping were carried out in cyclone 5. The liquid and vapor phases were separated and cooled to 25° C. (below the temperature for hydrate formation) and a liquid effluent was recovered via line 7 from the (preferably conical) bottom of the cyclone, at a pressure of 82 bar and enriched in $H_2S$, $CO_2$, water (soluble hydrates and soluble free water) and free sulphur. This effluent thus contained substantially all the water and only 8.5% of methane. A centrifugal pump 9 adapted to pump $H_2S$ (i.e., without joints) could have been used if necessary to reinject the $H_2S$ and $CO_2$ rich liquid effluent into the reinjection well 10 which could have been the same well from which the natural gas had been extracted, or a different well. The heat generated by the pumping was not sufficient to melt the transported hydrates.

A gaseous phase, containing only 540 ppm of water, $H_2S$, $CO_2$ and methane, was recovered overhead from cyclone 5. This passed through cooling and condensing apparatus, for example, a conventional gas/gas heat exchanger 12 followed by a propane cooler 20, to cool and condense at least a portion of the gaseous phase to a temperature of −18° C., for example. To further avoid hydrate and ice formation, methanol could have been introduced into line 6 via line 11 upstream of exchanger 12. The non dissolved water in the gaseous phase could thus be inhibited by addition of 55 weight % of methanol, for example.

The methane enriched gas and the condensate obtained, also any water-methanol mixture obtained, were separated in a drum separator 3 at a pressure of 81 bar and a temperature of −18° C. The water-methanol mixture recovered via line 13 from the bottom of drum 3 was introduced into condensate recycle line 8 after separation.

In a variation, the methanol and water recovered from the bottom of drum 3 was sent via line 21 to the top of a multi-stage counter-current stripping zone 22 which used a portion of the vapor phase from cyclone 5 as the stripping gas. This was introduced to the bottom of the stripping zone via line 23. The majority of the methanol was recovered overhead via line 24 and recycled to line 6 upstream of the cooler. Water was recovered from the bottom of the stripping zone via line 25.

After preheating in exchanger 15 described above, the $H_2S$ and $CO_2$ rich condensate, also containing methane and the water-methanol mixture were recycled via lines 8 and 2 and pump 14 (similar to pump 9), to vessel 5 which brought the liquid and gas phases into contact.

Methane enriched gas was recovered overhead from drum 3, containing about 15% of $H_2S$ and 11% of $CO_2$, meaning that the energy consumption in the downstream units which completely eliminate the $H_2S$ (amine units or other techniques as described in our patents EP-A-0 442 67 and U.S. Pat. No. 5,127,231) could be reduced.

A material balance is shown in the Table below.

MATERIAL BALANCE (MOLE %)

| Lines | Natural gas feed 1 | Vapour phase 6 | Recycled condensate 8-2 | Enriched gas 30 | Liquid effluent 7 |
|---|---|---|---|---|---|
| $C_1$ | 54 | 48.3 | 25.2 | 72.7 | 14.4 |
| $C_2$ plus | 1 | 1.1 | 1.4 | 0.9 | 1.6 |
| $CO_2$ | 11 | 13.2 | 15.2 | 11.1 | 10.5 |
| $H_2S$ | 34 | 37.4 | 58.2 | 15.4 | 73.5 |
| Total | 100 | 100 | 100 | 100 | 100 |
| Volume ($10^8$ m³/day) | 6.10 | 8.55 | — | 4.15 | — |
| kmoles/hour | 10758 | 15072 | 7741 | 7331 | 3427 |
| Molar weight | 25.5 | 26.8 | 31.1 | 22.1 | 32.7 |
| Tonnes/hour | 274.3 | 403.9 | 241.9 | 162 | 112.3 |
| Temperature (°C.) | 38 | 38 | −18 | −18 | 38 |
| Pressure (MPa) | 9.2 | 8.2 | 8 | 8 | 8.2 |
| Water content ppm(moles) | 1940 | 543 | 1000 | 60 | 5960 |

The total loss of methane and heavier hydrocarbons was 9.2% during elimination of 69% of the $H_2S$ and 33% of the $CO_2$.

We claim:

1. A process for pretreatment of a pressurized natural gas containing hydrocarbons, water and hydrogen sulfide, obtained from at least one producing well, said process comprising:

a) bringing at least a portion of said natural gas into contact with at least a portion of a liquid condensate, recycled from a separation zone, in a contact and vaporizing zone, recovering a vapor phase containing hydrogen sulfide and hydrocarbons from the head of said contact and vaporizing zone and recovering from the bottom of said contact and vaporizing zone a liquid effluent containing water, a major portion of the hydrogen sulfide, and a minor portion of hydrocarbons;

b) cooling and condensing at least a portion of said vapor phase to form an initial condensate;

c) separating said initial condensate obtained in said separation zone and recovering from said separation zone a gas, enriched in hydrocarbons and depleted in hydrogen sulfide, and said liquid condensate, which is to be recycled to said contact and vaporizing zone, said liquid condensate is enriched in hydrogen sulfide and contains hydrocarbons;

d) recycling said liquid condensate to said contact and vaporizing zone; and e) introducing said liquid effluent back into said producing well or into a different well.

2. A process according to claim 1, wherein said liquid condensate is preheated at least in part by an external heat exchanger before being introduced into said contact and vaporizing zone.

3. A process according to claim 1, wherein said liquid condensate is preheated in a heat exchange zone by at least a portion of said vapor phase.

4. A process according to claim 1, wherein said liquid condensate is recycled to a point upstream of said contact and vaporizing zone and then introduced into said contact and vaporizing zone.

5. A process according to claim 1, wherein said vapor phase contains water and a quantity of methanol is introduced into said vapor phase prior to subjecting said vapor phase to said cooling and condensing.

6. A process according to claim 5, wherein, after cooling and condensing at least a portion of said vapor phase, said water and methanol are both separated from said liquid condensate and said water and methanol are recycled with said liquid condensate.

7. A process according to claim 5, wherein, after cooling and condensing at least a portion of said vapor phase, said water and said methanol are separated from said liquid condensate and said water and methanol are sent to a stripping zone, at least a portion of said vapor phase is also delivered to said stripping zone, a methanol enriched effluent vapor is recovered from the head of said stripping zone and is recycled to said vapor phase at a point upstream of said cooling and condensing zone, and water is recovered from the bottom of said stripping zone.

8. A process according to claim 1, wherein said contact and vaporizing zone is operated at a temperature of 0°–100° C., and a pressure greater than 10 bars;

said separation zone is operated at a temperature of −80° C. to +30° C., and a pressure greater than 10 bars; and prior to introduction into said contact and vaporizing zone said liquid condensate is preheated to a temperature of −10° C. to 90° C.

9. A process according to claim 1, wherein said contact and vaporizing zone is a cyclone separator.

10. A process according to claim 1, wherein said pressurized natural gas has a partial pressure of hydrogen sulfide of at least 5 bar.

11. A process according to claim 2, wherein said liquid condensate is preheated in a heat exchange zone by at least a portion of said vapor phase.

12. A process according to claim 8, wherein said contact and vaporizing zone is operated at a temperature of 20°–60° C. and a pressure of 40–1.00 bar;

said separation zone is operated at a temperature of −40° C. to 0° C. and a pressure of 40–100 bar; and said liquid condensate is preheated to a temperature of 10°–50° C.

13. A process according to claim 1, wherein said contact and vaporizing zone is operated at a temperature of 0°–100° C. and a pressure greater than 10 bar.

14. A process according to claim 1, wherein said separation zone is operated at a temperature of −80° C. to +30° C. and a pressure of greater than 10 bar.

15. A process according to claim 13, wherein said separation zone is operated at a temperature of −80° C. to +30° C. and a pressure of greater than 10 bar.

16. A process according to claim 11, wherein said liquid condensate is preheated to −10° C. to 90° C. before being introduced into said contact and vaporizing zone.

17. A process according to claim 2, wherein said liquid condensate is preheated to −10° C. to 90° C. before being introduced into said contact and vaporizing zone.

18. A process according to claim 3, wherein said liquid condensate is preheated to −10° C. to 90° C. before being introduced into said contact and vaporizing zone.

19. A process according to claim 10, wherein said pressurized natural gas has a partial pressure of hydrogen sulfide of at least 10 bar.

20. A process according to claim 1, wherein said pressurized natural gas also contains carbon dioxide.

21. A process according to claim 7, wherein said stripping zone is integrated with said contact and vaporizing zone.

22. A process according to claim 1, wherein said liquid condensate is mixed with said pressurized natural gas prior to introduction into said contact and vaporizing zone.

23. A process according to claim 20, wherein said vapor phase contains carbon dioxide when recovered from the head of said contact and vaporizing zone, and said liquid condensate is enriched in carbon dioxide.

24. A process for pretreatment of a pressurized natural gas containing hydrocarbons, water and hydrogen sulfide, said process comprising:

a) bringing at least a portion of said natural gas into contact with at least a portion of a liquid condensate, recycled from a separation zone, in a contact and vaporizing zone, recovering a vapor phase containing hydrogen sulfide and hydrocarbons from the head of said contact and vaporizing zone and recovering from the bottom of said contact and vaporizing zone a liquid effluent containing water, a major portion of the hydrogen sulfide, and a minor portion of hydrocarbons;

b) cooling and condensing at least a portion of said vapor phase to form an initial condensate;

c) separating said initial condensate obtained in said separation zone and recovering from said separation zone a gas, enriched in hydrocarbons and depleted in hydrogen sulfide, and said liquid condensate, which is to be recycled to said contact and vaporizing zone, said liquid condensate is enriched in hydrogen sulfide and contains hydrocarbons; and d) recycling said liquid condensate to said contact and vaporizing zone.

* * * * *